United States Patent [19]

Ogasawara et al.

[11] 4,227,182
[45] Oct. 7, 1980

[54] MINUTE CHANGE DETECTING SYSTEM

[76] Inventors: Hiroomi Ogasawara, 3821-4; Masaomi Ogasawara, 3833, both of Yamakita, Yamakitamachi, Ashigarakami-gun, Kanagawa-ken, Japan

[21] Appl. No.: 933,685

[22] Filed: Aug. 15, 1978

Related U.S. Application Data

[63] Continuation of Ser. No. 721,904, Sep. 9, 1976, abandoned.

[30] Foreign Application Priority Data

Sep. 10, 1975 [JP] Japan .................................. 50-108848

[51] Int. Cl.² .................. G01R 27/26; G01L 1/14; G08C 19/10
[52] U.S. Cl. .................. 340/870.37; 73/DIG. 4; 73/DIG. 1; 73/579; 324/61 R; 324/79 D
[58] Field of Search ......... 340/200, 177 VA, 177 VC; 324/79 R, 79 D, 61 R; 331/1 A, 2, 36 R, 36 C, 37; 332/30 R; 73/DIG. 1, DIG. 3, DIG. 4, 579

[56] References Cited

U.S. PATENT DOCUMENTS

| | | | |
|---|---|---|---|
| 2,446,428 | 8/1948 | Merrill, Jr. .......................... 340/200 |
| 2,556,556 | 6/1951 | Schmitt et al. ....................... 340/207 |
| 2,929,020 | 3/1960 | Mayes .................................. 340/200 |
| 2,998,573 | 8/1961 | Beagles ............................... 331/37 |
| 3,012,193 | 12/1961 | Breen .................................. 340/200 |
| 3,227,952 | 1/1966 | Proebster et al. .................. 324/79 D |
| 3,274,828 | 9/1966 | Pulvari ............................... 73/DIG. 4 |
| 3,403,354 | 9/1968 | Harwood ............................ 332/30 R |
| 3,559,057 | 1/1971 | Huggett .............................. 324/79 D |
| 3,681,689 | 8/1972 | Correard et al. .................. 324/79 R |
| 3,845,377 | 10/1974 | Shimotori .......................... 340/200 |
| 3,860,918 | 1/1975 | Cencel ............................... 340/200 |
| 3,883,799 | 5/1975 | Ulyanov ............................. 324/61 R |
| 3,895,912 | 7/1975 | Naumann ........................... 331/37 |
| 3,924,177 | 12/1975 | Lemineur et al. ................. 340/200 |
| 3,990,005 | 11/1976 | Abbe et al. ........................ 324/61 R |
| 4,092,579 | 5/1978 | Weit ................................... 324/61 R |

Primary Examiner—Donald J. Yusko
Attorney, Agent, or Firm—Beveridge, DeGrandi, Kline & Lunsford

[57] ABSTRACT

A minute change detecting system comprises sensor means which changes its electrical constant according to a physical change of an object under measurement to affect the oscillation frequency of at least one of two high-frequency oscillators, and mixer means for producing a beat frequency signal from the output oscillation frequencies of the two oscillators, thereby to detect the physical change.

14 Claims, 6 Drawing Figures

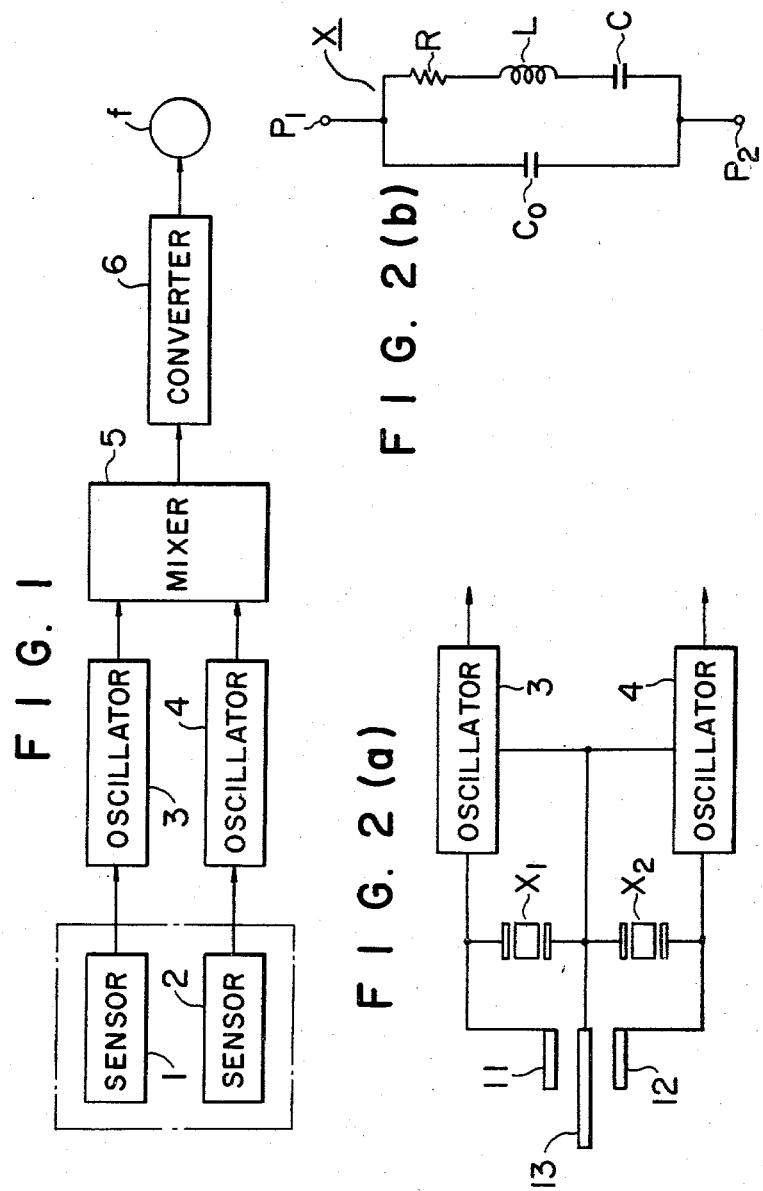

MINUTE CHANGE DETECTING SYSTEM

This is a continuation of application Ser. No. 721,904, filed Sept. 9, 1976, now abandoned.

BACKGROUND OF THE INVENTION

This invention relates to minute change detecting systems operating to provide electrical signals in response to minute physical changes, and more particularly to minute change detecting systems which are adapted to detect minute mechanical changes caused, for instance, by the rotation of a rotary structure, the vibration of a vibrating structure, and the motion, or deformation, of a pressure storing structure due to its pressure change, and to detect the minute changes of light, heat, pressure, concentration, density, etc.

A capacitor is known as a means to convert a physical change such as a mechanical, dimensional change into an electrical change. In principle, a capacitor consists of two conductor plates. The electrostatic capacity between the two conductor plates can be changed by mechanically displacing one of the two conductor plate. Accordingly, if a signal generator operating to change its output signal according to an electrostatic capacity change is combined with a capacitor which changes its electrostatic capacity according to mechanical displacement, it is possible to provide a minute change detecting system which provides an electrical signal corresponding to the amount of mechanical displacement.

Minute change detecting systems of this type have been proposed in the art. However, it cannot be said that they are sufficient, at least, in performance.

SUMMARY OF THE INVENTION

Accordingly, a general object of this invention is to provide a minute change detecting system having a high performance which is capable of producing an electrical signal according to a physical change of an object under measurement.

More specifically, a first object of the invention is to provide a minute change detecting system whose measurement error is minimized.

A second object of the invention is to provide a minute change detecting system in which the construction of an element for sensing a physical change of an object under measurement is simplified.

A third object of the invention is to provide a minute change detecting system in which the generation of noise is prevented.

A fourth object of the invention is to provide a minute change detecting system which is superior in sensitivity and linearity.

A fifth object of the invention is to provide a minute change detecting system in which a signal detecting section is coupled to a signal processing section by wireless.

A sixth object of the invention is to provide a minute change detecting system employing a wire system or a wireless system for transmitting signals between the circuit elements thereof.

A seventh object of the invention is to provide a minute change detecting system in which measurement results can be displayed on a meter or can be processed by a computer.

The foregoing objects and other objects of the invention have been achieved by the provision of a minute change detecting system which, according to the invention, comprises: sensor means for changing its electrical constant according to a physical change of an object under measurement; a pair of oscillator means for generating oscillation frequencies, at least one of the oscillator means changing its oscillation frequency according to a change of the electrical constant of the sensor means; mixer means for producing a beat frequency by mixing the oscillation frequencies produced by said oscillator means; and converter means for converting the beat frequency signal into a desired type of signal.

The nature, principle and utility of the invention will become more apparent from the following detailed description and the appended claims when read in conjunction with the accompanying drawings, in which like parts are designated by like reference characters.

BRIEF DESCRIPTION OF THE DRAWINGS

In the accompanying drawings:

FIG. 1 is a block diagrams showing the fundamental arrangement of a minute change detecting system according to this invention;

FIG. 2(a) is a circuit diagram, partly as a block diagram, showing essential parts of the minute change detecting system shown in FIG. 1;

FIG. 2(b) is the equivalent circuit diagram of a quartz oscillator shown in FIG. 2(a)

DETAILED DESCRIPTION OF THE INVENTION

Figure 3:
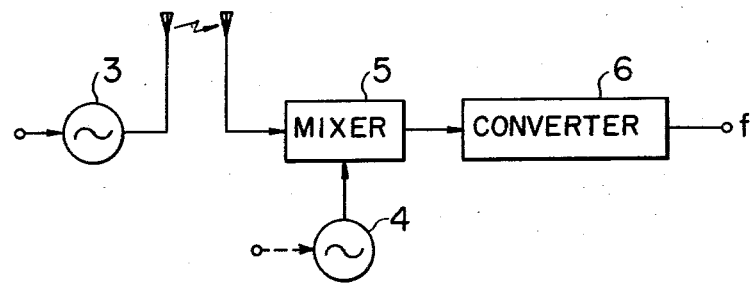
FIGS. 3(a) through 3(c) are block diagrams illustrating various examples of the minute change detecting system according to the invention.
Figure 3:
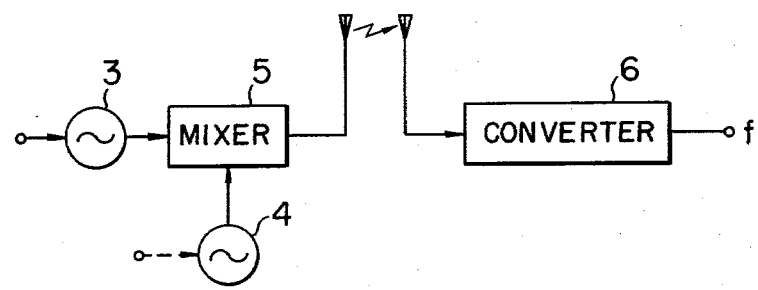
Figure 3:
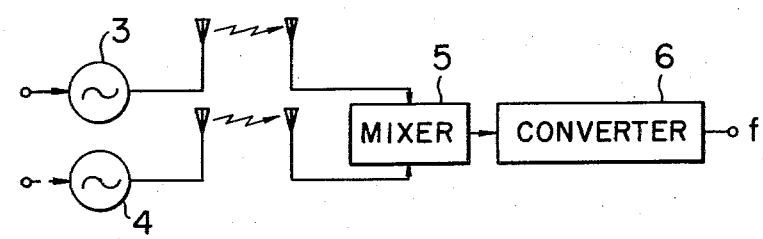

One example of a minute change detecting system according to this invention, as shown in FIG. 1, comprises: sensors 1 and 2 each of which changes its electrical constant, such as capacitance, in response to a physical change of an object under measurement; and oscillators 3 and 4 connected respectively to the sensors 1 and 2, each oscillator changing its oscillation frequency in response to a change of the electrical constant of the respective sensor. The sensor 1 or 2 may be one which produces an output that is a change in electrical quantity such as voltage and current. In this case, the oscillators 3 and 4 should be replaced with ones which operate in response to the changes in electrical quantity of the respective sensors.

One (the sensor 2 in FIG. 1) of the two sensors 1 and 2 may be omitted. In this case, one (the oscillator 4 in FIG. 1) of the two oscillators 3 and 4 will keep its output frequency constant.

The oscillators 3 and 4 are similar to each other in response characteristic, drift characteristic, and so forth. Therefore, if two inputs which are equal to each other in characteristic change are applied to the oscillators 3 and 4, respectively, the output frequencies of these oscillators are changed in the same rate or by the same frequency. The output frequencies of the oscillators 3 and 4 are applied to a mixer 5 where these frequencies are mixed to produce a beat frequency signal. This beat frequency signal is converted into a voltage or a pulse by a converter 6 whereby analog or digital measurement data f is obtained.

The transmission of the signals between the various elements in the system is effected in a wire system as in FIG. 1, or in a wireless system which will be described later.

If it is assumed that the oscillators 3 and 4 oscillate at frequencies $F_{10}$ and $F_{20}$, respectively, the interference frequency (or beat frequency) f can be represented by the following equation (1).

$$f = |F_{10} - F_{20}| \quad (1)$$

When the sensor 2 is kept inoperative so that the oscillation frequency $F_{20}$ is maintained unchanged, that is, when only the sensor 1 is rendered operative to detect a physical change of the substance under measurement, the oscillation frequency $F_{10}$ of the oscillator 3 is changed to an oscillation frequency $F_{11}$ which can be represented by the following equation (2)

$$F_{10} \to F_{11} = F_{10} + |\delta F_{10}| \quad (2)$$

Where $\delta$ is the frequency change rate due to the detection of the physical change, and therefore $\delta F_{10}$ is the amount of frequency change of the oscillation frequency $F_{10}$.

If it is assumed that the frequencies $F_{20}$ and $F_{11}$ provide an interference frequency $f_1$, then:

$$f \to f_1 = F_{11} - F_{20} \quad (3)$$
$$= (F_{10} - F_{20}) + \delta F_{10}$$
$$= f + \delta F_{10}$$

Thus, the amount of frequency change $\delta F_{10}$ with respect to the difference of the frequencies of the two oscillators is obtained.

In the case where the circuit constants and the like of each oscillator change, its oscillation frequency F is changed, or drifted, in a frequency change rate (hereinafter referred to as "an error frequency change rate $\epsilon$" when applicable) into an oscillation frequency F'. Since the two oscillators are similar in operating characteristic, the error frequency change rates $\epsilon$ thereof are substantially equal, and the frequency F' can be represented by the following equation (4):

$$F \to F' = F(1 + \epsilon) \quad (4)$$

If the frequency $F_{10}$ is changed to the frequency $F_{11}$ in the frequency change rate $\delta$ due to the physical change of the object under measurement, as was described before, $$F_{10} \to F_{11} = F_{10}(1 + \delta) \quad (5)$$

If, in the case where frequency $F_{11}$ is drifted in the error frequency change rate $\epsilon$, the resultant frequency is designated by $F_{11}'$, then from equations (4) and (5):

$$F_{10} \to F_{11} \to F_{11}' = F_{11}(1 + \epsilon) \quad (6)$$
$$= F_{10}(1 + \delta(1 + \epsilon)$$
$$= F_{10} + F_{10}\delta + F_{10}(1 + \delta)\epsilon$$

In this equation, the total amount of the frequency changes is represented by the second and third terms, and the amount of frequency change due to the drifting (hereinafter referred to as "an amount of error frequency change" when applicable) is represented by the third term $F_{10}(1 + \delta)\epsilon$.

If, in the case where the oscillation frequency of one (the oscillator 4 in FIG. 1) of the two oscillators undergoes only a frequency change in the error frequency change rate $\epsilon$ (instead of a frequency change of the frequency change rate $\delta$), the output data is designated by f', then:

$$F_{20} \to F_{20}' = F_{20}(1 + \epsilon)$$

If this is substituted in equation (1), then:

$$f' = F_{11}' - F_{20}' \quad (7)$$
$$= \{F_{10}(1 + \delta) - F_{20}\}(1 + \epsilon)$$
$$= (F_{10} - F_{20} + \delta F_{10})(1 + \epsilon)$$
$$\therefore f' = f + F_{10}\delta + (F_{10}\delta + F)\epsilon$$

In this equation (7), the second and third terms represents the total amount of the frequency changes, and the third term represents the amount of error frequency change.

Now, the case where the amount of frequency change due to the physical change is measured with a single oscillator will be compared with the case where it is measured with two oscillators, by taking the amount of error frequency change into account.

The output data in the former case can be represented by equation (6); $F_{11}' = F_{10}(1 + \epsilon)(1 + \delta)$: while the output data in the latter case can be represented by equation (7): $f' = (f + F_{10}\delta)(1 + \epsilon)$.

If the effect of the error frequency change rate $\epsilon$ to the output data, being equal in both cases, is eliminated, and only the ratio of the output frequencies in each case is considered,
in the former case, $$F_{11}'/F_{10} = 1 + \delta \quad (8),$$

and
in the latter case, $$f'/f = 1 + \frac{F_{10}}{f} \cdot \delta \quad (9)$$

As is apparent from the comparison of these equations (8) and (9), the change of the output frequencies in the latter case is $F_{10}/f$ times as much as that in the former case. Accordingly, with a pair of oscillators the physical change of the object under measurement can be more significantly or distinctively measured. Thus, in the former case, the construction of the system is relatively simple; while in the latter case employing a pair of oscillators to produce beat frequencies, the performance of the system can be improved.

An example of the arrangement of essential parts in the system shown in FIG. 1 is illustrated in FIG. 2(a).

In this example, the oscillators 3 and 4 have quartz oscillators $X_1$ and $X_2$ to produce outputs which are stable in frequency characteristic, respectively. The equivalent circuit of each quartz oscillator, as shown in FIG. 2(b), comprises a series circuit of a resistor R, an inductance L and a capacitor C, with a capacitor $C_o$ connected in parallel to the series circuit. The oscillation frequency of the quartz oscillator can be changed by connecting a capacitor in series to or in parallel to the terminals $P_1$ and $P_2$ of the equivalent circuit.

The circuit shown in FIG. 2(a) further comprises capacitors made up of conductor plates 11, 12 and 13. These capacitors are employed to change the oscillation frequencies of the quartz oscillator $X_1$ and $X_2$. However, in the case where it is required to detect physical quantities such as light, heat, pressure, concentration and density other than mechanical dimensional change, it may sometimes be difficult to detect them directly as change in capacitance. This difficulty can be overcome by converting the physical quantities into changes in capacitance.

The conductor plates 11 and 12 are mechanically fixed, while the conductor plate 13 is movably supported to respond to the motion of an object under measurement. For instance, if the movable conductor plate 13 is swung downward (as viewed in FIG. 2(a)) in response to the motion of the object, the distance between the movable conductor plate 13 and the upper stationary conductor plate 11 is increased while the distance between the movable conductor plate 13 and the lower stationary conductor plate 12 is decreased. As a result, the capacitance connected in parallel to the quartz oscillator $X_1$ is decreased to increase the oscillation frequency thereof, while the capacitance connected in parallel to the quartz oscillator $X_2$ is increased to decrease the oscillation frequency thereof. Accordingly, the output frequencies of the oscillators 3 and 4 increases and decreases, respectively, whereby the output frequency of the mixer (FIG. 1) increases. In contrast, if the movable conductor plate 13 is moved upward, the output frequency of the mixer 5 decreases.

The movement of the movable conductor plate 13 may be one obtained by bending or tilting the plate 13 itself, or may accompany vibration or rotation, or may be caused by vibration or rotation. If the stationary conductor plate 11 or 12 and the movable conductor plate 13 are exchanged with each other, or if one of the stationary conductor plates 11 and 12 is removed, the output frequency of one of the oscillators 3 and 4 can be fixed or maintained unchanged.

FIGS. 3(a) through 3(c) show wireless transmission systems for transmitting the output frequency signals of the oscillators 3 and 4. It should be noted that various means for high-frequency amplification, modulation, demodulation, etc. which are usually conducted in a wireless transmission system are not shown in FIGS. 3(a) to 3(c) for simplification. Therefore, if in FIGS. 3(a), 3(b), and 3(c) the antennas are connected directly to one another, the wireless transmission systems can be converted into wire transmission systems. The dotted arrow beside each oscillator 4 is intended to mean that the frequency of one (the oscillator 4 in FIGS. 3(a) to 3(c) of the oscillators 3 and 4 is variable or fixed.

In the circuit of FIG. 3(a), the output signal of the oscillator 3 is transmitted to the mixer through the antennas by wireless, and is then mixed with the output signal of the oscillator 4 in the mixer 5. The resultant output signal of the mixer 5 is applied to the converter 6 to obtain a measurement data f.

In the circuit of FIG. 3(b), the output signals of the oscillators 3 and 4 are mixed in the mixer 5, and the output signal of the mixer 5 is transmitted to the converter 6 by wireless to obtain a measurement data f.

In the circuit of FIG. 3(c), the output signals of the oscillators 3 and 4 are separately transmitted by wireless to the mixer 5, and the resultant output signal of the mixer 5 is applied to the converter 6 to produce a measurement data f.

As is apparent from the above description, in this invention the oscillation frequency of the two oscillators is changed, and the output signals of the two oscillators are mixed to provide a beat frequency signal. Thus, the detection accuracy is improved by employing the high-frequency oscillators, and the low-frequency signal which can be readily handled is obtained as the output signal. By suitably selecting the operating characteristics of the two oscillators, it is possible to substantially eliminate the effect of frequency drift therein and to provide a minute change detecting system superior in linearity, and if necessary it is possible to omit an operation circuit thereby to convert this system into a minute change detecting system having non-linear output characteristics.

Furthermore, the measurement error can be considerably reduced by employing the oscillators whose characteristics are similar to each other.

By fixing the oscillation frequency of one of the oscillators, the construction of the sensor means for detecting the physical change of an object under measurement can be simplified.

If a capacitor is employed as the sensor means which changes its electrical constant in response to the physical change of an object under measurement, it is unnecessary to electrically energize this means, and it is possible to provide a space between the object and the means, that is, the substance and the means can be arranged in contactless state, and therefore the generation of noise can be prevented.

If this capacitor is made up of at least one pair of stationary plates and at least one movable plate in such a manner that one stationary plate and the movable plate are connected to one of the oscillators while the other stationary plate and the movable plate are connected to the other oscillator, the minute change detecting system thus organized is much higher in sensitivity and linearity than that in which one capacitor and one oscillator are utilized.

In the case where the output signals of the oscillators are transmitted by wireless, the signal detecting section and the signal processing section can be coupled without wiring.

The employment of modulation in the wireless transmission is successful for prevention of signal interference.

If the minute change detecting system is so designed as to operate in a wire transmission system, the arrangement thereof can be simpler than that of the minute change detecting system operating in a wireless transmission system.

If the output of the system is converted into analog data, it can be displayed with a suitable meter. If the output is subjected to digital conversion, it can be readily processed by a digital computer which is more extensively employed than an analog in the art. With respect to this digital conversion, the conventional minute change detecting system necessitates the provision of an expensive analog-to-digital converter to obtain a digital signal because it is of the analog output type. On the other hand, the minute change detecting system according to the invention needs no analog-to-digital converter.

We claim:
1. A system for detecting displacement of an object, comprising:
(a) a sensor including a first stationary electrode plate, a second stationary electrode plate spaced from said first stationary electrode plate, and a movable electrode plate spaced from said first stationary electrode plate to provide a first gap therebetween and spaced from said second stationary electrode plate to provide a second gap therebetween, thereby forming two variable capacitors; said movable electrode plate responsive to displacement of the object to move closer to one of said stationary electrode plates to reduce the gap therebetween and further from the other of said stationary electrode plates to increase the gap therebetween, thereby causing the capacitance of one of said variable capacitors to increase and the capacitance of the other of said variable capacitors to decrease;

(b) two oscillator circuits, each having an associated one of said variable capacitors incorporated therein as a frequency varying component; and (c) a mixer connected to said two oscillator circuits for providing a beat frequency signal of a frequency determined by the difference in the frequencies of said two oscillator circuits.

2. A system as claimed in claim 1 in which said oscillator circuits are similar to each other in operating characteristic.

3. A system as claimed in claim 1 further comprising converter means coupled to said mixer for converting the beat frequency signal into a converted signal.

4. A system as claimed in claim 3 in which said oscillator circuits, mixer, and converter means are coupled by means of signal transmission paths including at least one wireless signal transmission path.

5. A system as claimed in claim 3 in which said oscillator circuits, mixer, and converter means are coupled by means of signal transmission paths all of which are wire signal transmission paths.

6. A system as claimed in claim 1 in which each of said oscillator circuits comprises a crystal controlled oscillator.

7. A system as claimed in claim 1 in which each of said oscillator circuits comprises a quartz oscillator.

8. A minute change detecting system which comprises:

(a) sensor means including a pair of stationary electrode plates and a movable electrode plate positioned between said pair of stationary electrode plates to form a pair of variable capacitors, with the capacitance of one of said variable capacitors increasing and the capacitance of the other of said variable capacitors correspondingly decreasing differentially as said movable electrode plate moves to cause differential distance changes against said stationary electrode plates in response to dimensional changes in an object to be monitored;

(b) two oscillator circuits, each having an associated one of said variable capacitors incorporated therein as a frequency varying component; and (c) a mixer connected to said two oscillator circuits for providing a frequency difference signal determined by the difference in the frequencies of said two oscillator circuits.

9. A system as claimed in claim 8 further comprising converter means coupled to said mixer for converting the frequency difference signal into a converted signal.

10. A system as claimed in claim 8 in which said oscillator circuits are similar to each other in operating characteristic.

11. A system as claimed in claim 9 in which said oscillator circuits, mixer, and converter means are coupled with signal transmission paths including at least one wireless signal transmission path.

12. A system as claimed in claim 9 in which said oscillator circuits, mixer and converter means are coupled by means of signal transmission paths all of which are wire signal transmission paths.

13. A system as claimed in claim 8 in which each of said oscillator circuits comprises a crystal controlled oscillator.

14. A system as claimed in claim 8 in which each of said oscillator circuits comprises a quartz oscillator.

* * * * *